US012738681B2

(12) United States Patent
Dyck

(10) Patent No.: US 12,738,681 B2
(45) Date of Patent: Sep. 15, 2026

(54) CIRCUIT BOARD CONNECTING TERMINAL, CONTACT PART, AND PRINTED CIRCUIT BOARD

(71) Applicant: WAGO Verwaltungsgesellschaft mbH, Minden (DE)

(72) Inventor: Tobias Dyck, Rahden (DE)

(73) Assignee: WAGO Verwaltungsgesellschaft mbH, Minden (DE)

( * ) Notice: Subject to any disclaimer, the term of this patent is extended or adjusted under 35 U.S.C. 154(b) by 369 days.

(21) Appl. No.: 18/542,575

(22) Filed: Dec. 15, 2023

(65) Prior Publication Data

US 2024/0204437 A1 Jun. 20, 2024

(30) Foreign Application Priority Data

Dec. 19, 2022 (DE) ..................... 20 2022 107 065.2

(51) Int. Cl.
*H01R 13/187* (2006.01)
*H01R 12/75* (2011.01)

(52) U.S. Cl.
CPC ........... *H01R 13/187* (2013.01); *H01R 12/75* (2013.01)

(58) Field of Classification Search
CPC .................................................. H01R 4/48185
USPC ................................ 439/816, 708, 441, 437
See application file for complete search history.

(56) References Cited

U.S. PATENT DOCUMENTS

| | | | | |
|---|---|---|---|---|
| 6,146,187 A * | 11/2000 | Pallai | H01R 4/4828 439/441 |
| 6,146,217 A * | 11/2000 | Osada | H01R 4/4833 439/441 |
| 7,896,686 B2 * | 3/2011 | Hoppe | H01R 4/4846 439/441 |
| 8,113,858 B1 * | 2/2012 | Chiang | H01R 4/4816 439/441 |
| 8,475,191 B2 * | 7/2013 | Schafmeister | H01R 4/483 439/489 |
| 8,932,075 B2 * | 1/2015 | Reibke | H01R 4/4846 439/708 |
| 9,240,650 B2 * | 1/2016 | Wu | H01R 4/483 |
| 10,389,049 B2 * | 8/2019 | Stromiedel | H01R 12/57 |
| 10,615,519 B2 * | 4/2020 | Koellmann | H01R 4/4821 |
| 10,777,917 B2 * | 9/2020 | Wang | H01R 4/4821 |
| 11,600,934 B2 | 3/2023 | Stromiedel et al. | |

(Continued)

FOREIGN PATENT DOCUMENTS

| | | | |
|---|---|---|---|
| CN | 105449384 A * | 3/2016 | H01R 12/515 |
| CN | 107104297 A * | 8/2017 | H01R 11/22 |
| CN | 110571543 A | 12/2019 | |

(Continued)

*Primary Examiner* — Hae Moon Hyeon
(74) *Attorney, Agent, or Firm* — Muncy, Geissler, Olds & Lowe, P.C.

(57) ABSTRACT

A circuit board connecting terminal for connecting electrical conductors to a printed circuit board, having a contact insert that has a contact part and a clamping spring, wherein an electrical conductor inserted into the circuit board connecting terminal can be clamped against the contact part with the clamping spring. The circuit board connecting terminal has a connection element for joining the circuit board connecting terminal. Also, a contact part for a circuit board connecting terminal and a printed circuit board having a circuit board connecting terminal are provided.

36 Claims, 15 Drawing Sheets

(56) References Cited

U.S. PATENT DOCUMENTS

| | | | | |
|---|---|---|---|---|
| 11,670,878 B2 * | 6/2023 | Wu | ........................ | H01R 4/483<br>361/823 |

FOREIGN PATENT DOCUMENTS

| | | | | |
|---|---|---|---|---|
| DE | 102011108828 A1 | 1/2013 | | |
| DE | 102015120063 B3 | 1/2017 | | |
| DE | 202016105702 U1 | 1/2018 | | |
| DE | 202019104688 U1 * | 12/2020 | ............. | H01R 4/485 |

* cited by examiner

CIRCUIT BOARD CONNECTING TERMINAL, CONTACT PART, AND PRINTED CIRCUIT BOARD

CROSS-REFERENCE TO RELATED APPLICATIONS

This nonprovisional application claims priority under 35 U.S.C. § 119(a) to German Patent Application No. 20 2022 107 065.2, which was filed in Germany on Dec. 19, 2022, and which is herein incorporated by reference.

BACKGROUND OF THE INVENTION

Field of the Invention

The present invention relates to a circuit board connecting terminal for connecting electrical conductors to a printed circuit board, having a contact insert that has a contact part and a clamping spring, wherein an electrical conductor inserted into the circuit board connecting terminal can be clamped against the contact part with the clamping spring. The circuit board connecting terminal has a connection element for joining the circuit board connecting terminal.

The invention additionally relates to a contact part for a circuit board connecting terminal and to a printed circuit board having a circuit board connecting terminal.

Description of the Background Art

Circuit board connecting terminals are conductor connection terminals that can be installed on or in a printed circuit board and are configured to establish an electrical connection between the printed circuit board and an electrical conductor that is not part of the printed circuit board. Conductor connection terminals in general are known from electrical connection technology. As electromechanical connection components, they serve to connect electrical conductors in order to produce an electrical connection. The electrical conductor, for example a stripped conductor wire, can be connected by means of a spring-loaded connection in that it is clamped against an electrically conductive contact part by the spring force of a clamping spring, wherein the clamping spring fixes the electrical conductor in place on the contact part and in this way secures and improves the electrical connection.

In order to install and to connect the circuit board connecting terminal to the printed circuit board, circuit board connecting terminals have connection elements that are joined to the printed circuit board mechanically or in a material-to-material manner, for example.

The contact part of the circuit board connecting terminal normally forms a flat contact point or stamped contact bead for the conductor, against which the latter is pressed by means of the clamping spring.

The contact parts of circuit board connecting terminals frequently are material- and cost-intensive on account of their shape and geometric design. The options for connecting conductors from different spatial directions are limited structurally. Moreover, it is desirable to provide circuit board connecting terminals that are more compact in order to permit convenient conductor connection even in restricted spatial conditions.

SUMMARY OF THE INVENTION

It is therefore an object of the present invention to provide a circuit board connecting terminal, a contact part for a circuit board connecting terminal, and a printed circuit board having a circuit board connecting terminal that are economical in terms of materials, are compact, and are versatile in application.

Provision is made according to an example of the invention that the contact part has a through opening that is delimited by an opening edge, wherein the conductor can be clamped to the opening edge of the through opening by means of the clamping spring. A compact circuit board connecting terminal with a flatter structure and a material-reduced contact part can be made possible with such a conductor connection solution. While it is necessary with the circuit board connecting terminals known in the prior art to insert the conductors into the terminal approximately parallel to the flat or beadlike contact surface of the contact part, versatile options can now be provided for connecting conductors that can be brought to the through opening of the contact part from different spatial directions. The circuit board connection solution presented is very compatible in design terms with different actuation types, and can be actuated easily with a lever, pushbutton, or separate tool, for example. The opening edge of the through hole forms a defined contact region with good current transfer properties. In a connection position, sections of the conductor can project into the through opening so that a reliable clamping of the conductor to the opening edge is possible.

The circuit board connecting terminal can have an insulating housing in which the contact insert is accommodated so that the insert is protected from environmental influences. It is also possible, however, to provide a circuit board connecting terminal having the features according to the invention that has no housing in order to make possible an even more compact circuit board connecting terminal. The clamping spring can be removably joined to the contact part, for example suspended in the contact part. The clamping spring can be supported on the contact part and/or on the insulating housing. The clamping spring can have a clamping leg whose spring force can be used for clamping the conductor to the opening edge. The clamping leg of the clamping spring can protrude into the through opening in order to be able to better clamp the conductor to the opening edge.

The opening edge can have an edge collar. The electrical conductor can be clampable to the edge collar by means of the clamping spring. An edge collar can be an additional flap of material that adjoins the opening edge. The edge collar can project at an angle from the region of the contact part that delimits the through opening. The angle can be, for example, an angle between 10° and 170° or between 30° and 150° or between 60° and 120°. The angle can vary or be constant in different sections or over the entire length of the edge collar. The edge collar can be made of an electrically conductive material, for example a sheet metal. The edge collar can enlarge the edge area of the opening edge in order to provide an improved contact and support area for the conductor to be connected.

The edge collar can surround the through opening in sections or completely, which is to say be formed on only part of the opening edge or be present around the entirety of the opening edge. In this way, potential connection regions and positions for electrical conductors can be selectively defined or optimized.

The edge collar can be formed as one piece with the contact part. For example, the edge collar can be bent down or folded down from the contact part. For example, the contact part can be produced with the edge collar by means of a stamping and bending process. Alternatively, it is possible that the edge collar is joined as a separate element to the opening edge, for example is inserted into the through opening later. In this way, it is possible to simplify production of the contact part, which can then be produced by means of a stamping process and a subsequent insertion of the edge collar, for example.

The edge collar can have a height in relation to the opening edge that corresponds to an extent of the edge collar from a free collar edge to a lateral edge of the opening edge. The height can be constant or vary over the entire length or in different sections of the edge collar. In this way, potential connection regions and positions for electrical conductors can be selectively defined or optimized.

The through opening can be produced as a plunged feature, so that the through opening is a plunged hole. Simple manufacture of the through hole is made possible in this way. A plunged feature can be a recess introduced into an essentially flat component. With the plunging method, the material of the contact part that is displaced from the opening region can be at least partially bent down from the opening edge, for example. The displaced material of the plunged feature can form a plunged boss on the plunged hole that surrounds it in sections or completely, for example. The plunged boss can form a contact surface for the conductor to be connected. The plunged boss can extend at an angle to the main plane of extent of the contact part, also referred to as contact part plane, or to the region of the contact part adjoining the plunged hole.

The connection element of the circuit board connecting terminal can be arranged on the contact part, for example. The connection element of the circuit board connecting terminal can project from the contact part, for example. The circuit board connecting terminal can have multiple connection elements.

The connection element can have a connection for joining the connection element to the printed circuit board. The connection can be spaced apart from a contact part plane of the contact part in such a manner that the through opening and/or an edge collar of the contact part is spaced apart from the printed circuit board when the circuit board connecting terminal is connected to the printed circuit board by means of the connection. The connection can also be spaced apart from the contact part plane of the contact part in such a manner that the through opening and/or an edge collar of the contact part lies in the circuit board plane when the circuit board connecting terminal is connected to the printed circuit board by means of the connection. The contact part can be configured, for example, for sections of it, for example the through hole and/or an edge collar, to project into a recess in the printed circuit board when the circuit board connecting terminal is connected to the printed circuit board by means of the connection. An especially space-saving and stable arrangement of the circuit board connecting terminal on the printed circuit board is achieved in this way. For example, a distance can be provided between the connection plane and the through hole of the contact part that is somewhat smaller than a normal thickness of a printed circuit board, for example not more than 1.5 mm. The connection plane can also lie in the contact part plane, so that the contact part can be supported on a surface of the printed circuit board by the connections, and the edge collar below the contact part plane can protrude into a recess of the printed circuit board.

The connection element can transition into a connection at a free end of the connection element without angling or bending. The connection can also be bent down or angled from the connection element, however.

The connection can be a soldered connection or a plug-in connection, for example. Simple and intuitive joining of the circuit board connecting terminal to the printed circuit board is possible in this way. The soldered connection can be a solder pad, for example. The connection element can be designed as a soldered contact pin, also called a soldering post, for example. The connection can be designed as a press-fit contact. The connection can be designed as a Surface-Mounted Device (SMD) connection. For this purpose, the connection plane can, for example, lie in the contact part plane, which is defined by the region of the contact part bordering the through opening. A plug-in connection can be designed as a bifurcated contact or latching contact, for example. A plug-in connection has the advantage that the circuit board connecting terminal is nondestructively removable from the printed circuit board and is reusable.

The connection element can be designed to be integral with the contact part. Simple and cost-effect manufacture of the contact part with the connection element is possible in this way. Moreover, good electrical conductivity at the transition between the contact part and the connection element can be ensured in this way. An "integral design" is understood within the scope of this application as a one-piece design, for example through fabrication in a combined manufacturing process. In particular, the connection element cannot be connected removably, in particular here cannot be connected nondestructively removably, to the contact part. The contact part can be manufacturable with the connection element in a stamping and bending process, for example. A plunging process for manufacturing the through hole can optionally follow the stamping and bending process.

The connection element can be designed as a contact pin. A contact pin can be an essentially rigid prong made of an electrically conductive material. Simple and stable joining of the circuit board connecting terminal to the printed circuit board is possible with a connection element designed as a contact pin.

The connection element can be bent down from the contact part. A simple connecting of the connection element to the printed circuit board can be made possible in this way. The connection element can extend at an angle to the contact part plane, wherein what is meant hereby is the plane of the contact part region into which the through opening is introduced or which adjoins the through opening or frames the through opening. An angled shape of the connection element can mean, for example, an angle between the connection element and the contact part plane that is between 10° and 170° or between 30° and 150° or between 60° and 120°. The connection element can, in particular, extend essentially perpendicular to the contact part plane. The connection element can be manufactured as one piece with the contact part, for example through a stamping and bending process.

The connection element can project from the contact part in the contact part plane. The plane of the contact part region into which the through opening is introduced or which adjoins the through opening or frames the same can be meant in this case. The connection element can be produced as one piece with the contact part, for example through a stamping process. The connection element in this example is not bent down or angled from the contact part, but instead runs basically at a 0° angle to a main plane of extent of the contact part. Very small angles, such as between 0 and 10°, are also included in this example. The contact part and the connection element can transition flush to one another. A circuit board connecting terminal with an especially flat construction is made possible with this example.

At least sections of an edge collar of the contact part can extend essentially parallel to the connection element. The edge collar and the connection element can be spaced apart from one another. The edge collar can adjoin an inner edge of the contact part on the through hole, while the connection element can be arranged on an outer edge of the contact part. However, it is also entirely possible to have the connection element project at an inner edge of the contact part on the through hole. The edge collar and the connection element can project from the contact part in the same spatial direction starting from the contact part plane in order to reduce the space required by the circuit board connecting terminal. However, it is also entirely possible that the edge collar and the connection element project from the contact part in different spatial directions, even in mutually opposite directions, for example.

The connection element can be bent down or project from an outer contour of the contact part. The outer contour can be the edge region on the perimeter or outline of the contact part. The outer contour can correspond to the contact part outer edge. An inner contour of the contact part can be defined by the edge of the through hole. In this example, the connection element does not project at an arbitrary position between the contact part outer edge and the through hole, but instead at the outer circumference of the contact part. Simple manufacture of the contact part, for example by means of a stamping process or stamping and bending process, is made possible in this way.

The connection element can be arranged on a corner region of the contact part or between two corner regions of the contact part. Mechanically and/or electrically stable joining of the contact part to the printed circuit board is made possible in this way. A corner region can be a region where an outer contour of the contact part is turned in a different direction, which is to say an angle or bend is present at the outer contour, for example. A corner region can be a region where two outer contour sides transition into one another. The connection element can originate at this transition or between two transitions. For example, the corner region can be a transition between a shorter end face and a longer longitudinal side. If the connection element is arranged between two corner regions of the contact part, it can be arranged essentially centered between two corner regions, for example.

The circuit board connecting terminal can have at least two connection elements. The connection elements can have the same or different shapes. The connection elements can have the same or different connections. The connection elements can be oriented in the same or different orientations to the contact part. The connection elements can be arranged next to one another on a contact part side or on different contact part sides. The connection elements can be arranged on mutually opposite contact part sides. Stable joining of the circuit board connecting terminal to the printed circuit board is possible with at least two connection elements. Moreover, a custom design of the connection structure in accordance with different functions or requirements for the circuit board connecting terminal is possible.

Connection elements can be arranged on at least two different outer contour sides of the contact part. Stable joining of the circuit board connecting terminal to the printed circuit board is possible in this way. The contact part can, for example, have a straight outer edge between two corner regions that can be viewed as an outer contour side. For example, a contact part with four corner regions can also have four outer contour sides. Connection elements of the circuit board connecting terminal can be arranged on mutually opposite or on adjoining outer contour sides, for example. Multiple connection elements per outer contour side can be provided. Shorter and longer outer contour sides can be present on a contact part. Furthermore, connection elements can be present on shorter or longer outer contour sides, on shorter and longer outer contour sides, or on all outer contour sides.

At least one connection element can be provided per outer contour side of the contact part. Stable and uniform joining of the circuit board connecting terminal to the printed circuit board is made possible in this way. For example, a connection element can be provided on every outer contour side. For example, two connection elements each can be present on at least two outer contour sides.

Connection elements can extend essentially parallel to one another. Stable and uniform joining of the circuit board connecting terminal to the printed circuit board is made possible in this way. In principle, the connection elements can also project from the contact part in different orientations or anglings, for example. It can be advantageous, however, when multiple or all connection elements are oriented essentially parallel to one another, in particular when they are designed as contact pins. Connection elements, for example connection elements with SMD connections, can also extend in a common plane.

At least one connection element can have a greater linear dimension than another connection element of the contact part. The linear dimension can be the longest dimension of the connection element. The linear dimension can be described by the length of the connection element between its free end and the contact part plane of the contact part. The linear dimension can, in particular, be different for connection elements that are designed as contact pins. Different linear dimensions result in different distances of contact part regions from the printed circuit board when the circuit board connecting terminal is joined to the printed circuit board by the connection elements. An inclined position of the contact part relative to the printed circuit board, for example, is possible in this way. Easier conductor insertion can be made possible in this way, which is advantageous in tight installation space conditions, for example.

The edge collar can have at least one radially inward extending contact edge. The contact edge in this case protrudes toward a conductor to be clamped to the edge collar. The extension of the contact edge from the edge collar is present on a surface of the edge collar facing the conductor to be clamped. The contact edge can be curved in a convex manner from the edge collar toward the conductor to be clamped, for example. A specific and defined contacting of the conductor with improved current transfer can be achieved at the contact edge. The contact edge can be provided next to a connection element in order to achieve more stable support of the contact part during clamping. For example, a connection element can be present on an outer contour side of the contact part that extends essentially parallel to the edge collar section with the contact edge and is closer to the edge collar section than another outer contour side that extends essentially parallel to the edge collar section with the contact edge.

A clamping edge of the clamping leg of the clamping spring can be opposite the contact edge when an electrical conductor is clamped to the edge collar. Improved contacting of the conductor at the contact edge can be achieved in this way.

The edge collar can have a lead-in chamfer. The lead-in chamfer can be a lead-in curvature or lead-in bevel, for example. The lead-in chamfer can end at a contact edge of the edge collar, for example. The lead-in chamfer can extend at an angle or with a curve to a contact surface onto which the electrical conductor is clamped. With a lead-in chamfer, insertion of the conductor is simplified and the risk of splaying of conductor wires is reduced. The lead-in chamfer can be provided next to a connection element in order to achieve more stable support of the contact part during clamping. For example, a connection element can be present on an outer contour side of the contact part that extends essentially parallel to the edge collar section with the lead-in chamfer and is closer to the edge collar section than another outer contour side that extends essentially parallel to the edge collar section with the lead-in chamfer.

The through opening can have a quadrilateral passage contour. The passage contour can also be viewed as the inner contour of the contact part. The quadrilateral passage contour can form a regular quadrilateral, for example. An example of the contact part that is economical in terms of materials and easy to manufacture can be made possible in this way.

The passage contour can have narrow sides and long sides, wherein the long sides are longer than the narrow sides. The connection element can be arranged on an outer contour side of the contact part that extends essentially parallel to a narrow side of the passage contour. An edge collar section with a contact edge and/or a lead-in chamfer can be on one of the narrow sides, for example. It can be possible for the conductor to be clamped to a narrow side of the passage contour so that a circuit board connecting terminal having a compact conductor connection is provided. The connection element can be arranged next to the clamping point formed on the narrow side by arranging it on an outer contour side of the contact part that extends essentially parallel to a narrow side of the passage contour. The circuit board connecting terminal can therefore be well supported by the connection element on the printed circuit board in the region of the clamping point.

The circuit board connecting terminal can have an insulating housing. The insulating housing can be a plastic housing, for example. The insulating housing can protect the contact insert from environmental influences and from being touched. At least sections of the contact insert can be accommodated in the insulating housing. At least sections of the connection element can extend outside the insulating housing so that a connection of the connection element is exposed and can be connected to the printed circuit board.

The insulating housing can have a conductor receiving space for the conductor end of a conductor clamped onto the contact part. The conductor receiving space can adjoin the through opening of the contact part in the conductor insertion direction. The conductor receiving space can be a volume that is delimited by the insulating housing and is in the form of a bay that accommodates the conductor end and protects it from environmental influences and being touched.

The insulating housing can have a lateral installation opening for insertion of the contact part or contact insert transverse to a conductor insertion direction. The insertion can take place in an installation direction that is transverse to the conductor insertion direction. The insulating housing can be designed as at least two pieces with a base housing and a cover part, which can be detachably joined to one another, wherein the cover part covers the installation opening in the assembled state of the insulating housing. The outline of the installation opening can correspond essentially to the outer contour of the contact part or of the contact insert, so that intuitive and reliable installation is made possible. The contact part can, for example, be insertable through the installation opening in a base housing of the insulating housing with an outer contour side foremost, which, for example, can extend parallel to a long side of the through hole. The base housing of the insulating housing can have a latch for securing the contact part or contact insert in the base housing. The cover part of the insulating housing can have a latch for securing the cover part on the base housing.

The circuit board connecting terminal can have a conductor stop. The conductor stop can limit the insertion travel of an electrical conductor into the circuit board connecting terminal. The conductor stop can be a mechanical structure or surface that blocks an insertion travel of the electrical conductor beyond a defined conductor region. The conductor stop can be formed by a stop surface of the insulating housing, of the printed circuit board, or of the contact part, for example.

The circuit board connecting terminal can have a conductor insertion passage. The conductor insertion passage can be a cylindrical or funnel-shaped tunnel, for example, through which an electrical conductor can be guided to the clamping point of the conductor at the through hole of the contact part. The conductor insertion passage can be formed by the insulating housing and/or the contact part, for example.

The circuit board connecting terminal can have an actuating element. With the actuating element, a clamping leg of the clamping spring, for example, can be displaced in order to open a clamping point of the circuit board connecting terminal. The actuating element can be a pushbutton or a lever, for example. The actuating element can be supported in an insulating housing of the circuit board connecting terminal, for example. Alternatively or in addition, it is possible that the actuating element is supported on the contact part of the circuit board connecting terminal. In this case, the opening edge of the through hole and/or an edge collar of the contact part can also be useful for supporting the actuating element, so that the actuating element is at least partially supported on the opening edge and/or edge collar.

The object is also attained by a contact part for a circuit board connecting terminal. Provision is made according to the invention that the contact part has a through opening with an opening edge delimiting the same, onto which edge an electrical conductor can be clamped by means of a clamping spring, and that the contact part has a connection element for joining the contact part to a printed circuit board. The advantages of a low-profile and material-reduced contact part with versatile conductor connection options that are beneficial for circuit board connecting terminals are achieved in this way, as well. The contact part can, in particular, be designed according to one of the above-described features, for example have an edge collar on the opening edge or have a connection element with a soldered or plug-in connection. The connection element can be designed according to one of the above-described features, for example extend in the contact part plane, or be bent down therefrom, starting from the contact part.

The object is also attained by a printed circuit board having a circuit board connecting terminal. In this case, the circuit board connecting terminal has a contact insert that has a contact part and a clamping spring, wherein an electrical conductor inserted into the circuit board connecting terminal can be clamped against the contact part with the clamping spring. The circuit board connecting terminal is joined to the printed circuit board by means of a connection element. Provision is made according to the invention that the contact part of the circuit board connecting terminal has a through opening that is delimited by an opening edge, wherein the conductor can be clamped to the opening edge of the through opening by means of the clamping spring. The advantages of a low-profile and material-reduced conductor connection terminal with versatile conductor connection options that are beneficial for conductor connection terminals are achieved in this way, as well.

The printed circuit board can have a recess into which at least sections of the contact part of the circuit board connecting terminal project. An especially space-saving and stable arrangement of the circuit board connecting terminal on the printed circuit board is achieved in this way. For example, the region of the contact part with the through hole, or an edge collar of the contact part, can project into the recess.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1A:
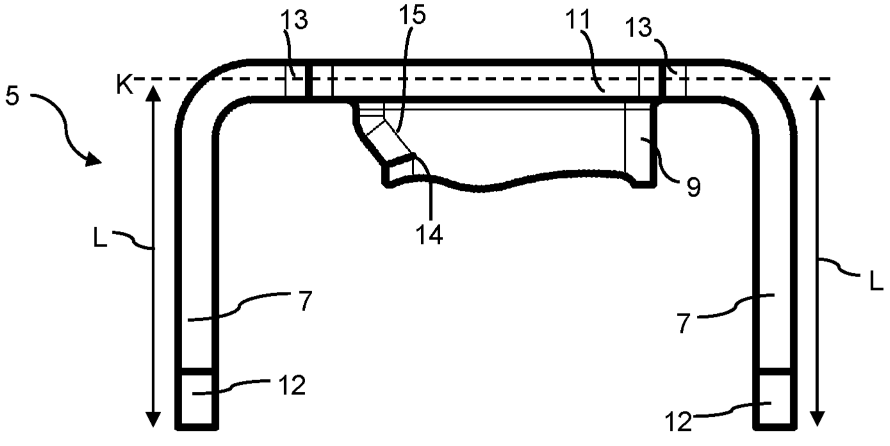
FIGS. 1*a*-1*d* show a contact part for a circuit board connecting terminal according to an example in a front view, side view, top view, and perspective view.
Figure 1B:
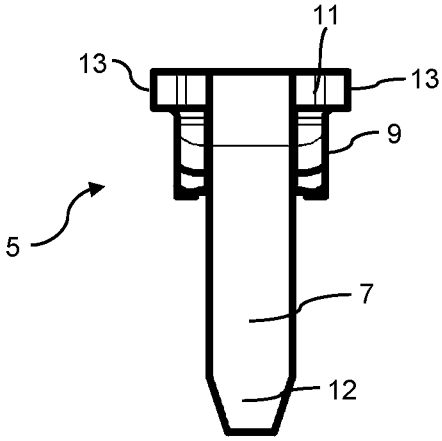
Figure 1C:
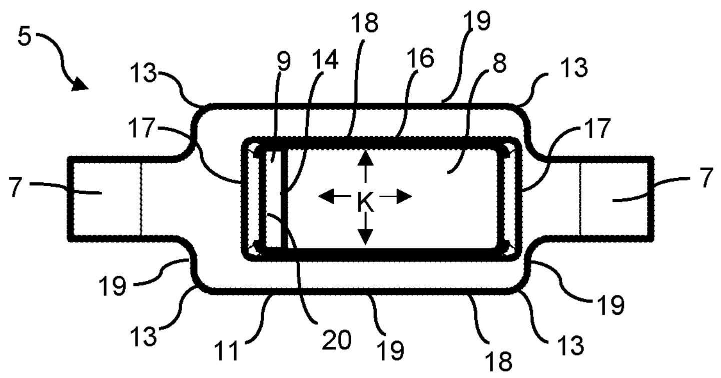
Figure 1D:
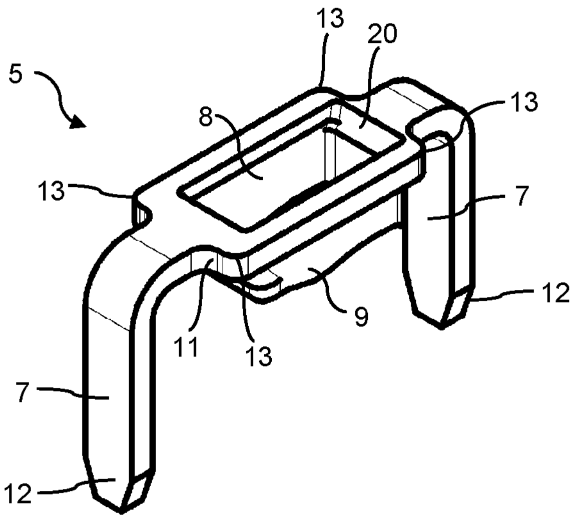
Figure 2A:
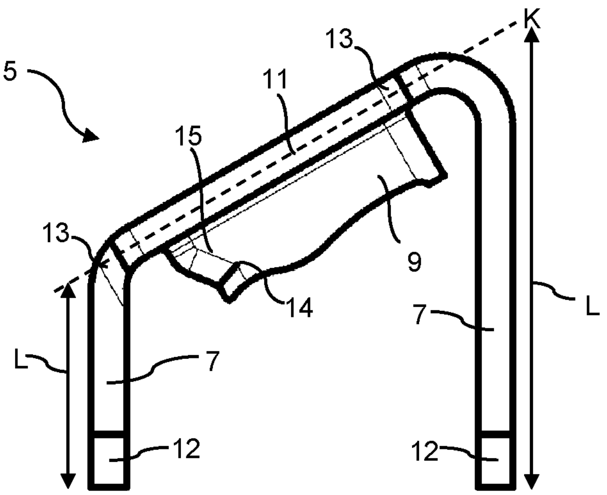
FIGS. 2*a*-2*d* show a contact part for a circuit board connecting terminal according to an example in a front view, side view, top view, and perspective view.
Figure 2B:
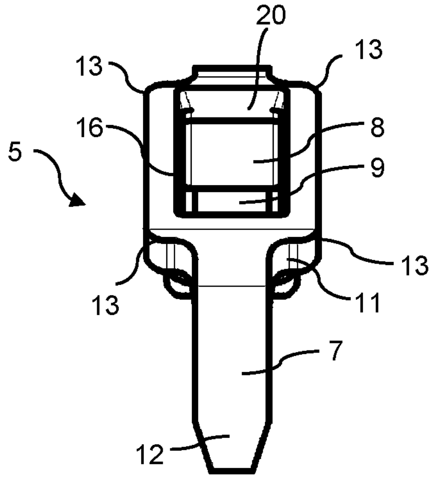
Figure 2C:
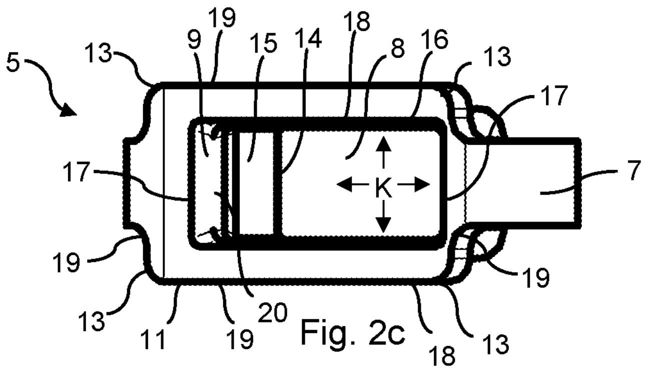
Figure 2D:
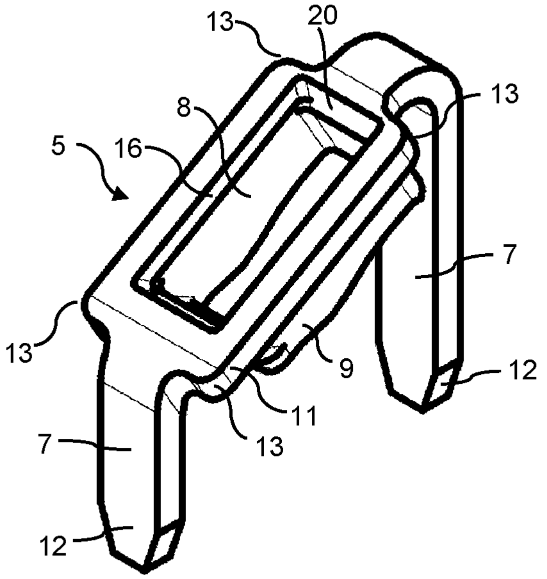
Figure 3A:
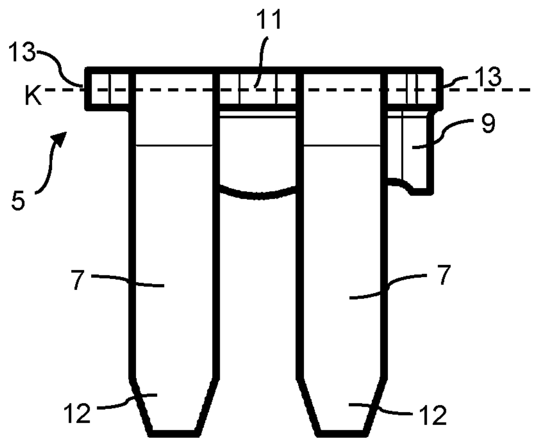
FIGS. 3*a*-3*d* show a contact part for a circuit board connecting terminal according to an example in a front view, side view, top view, and perspective view.
Figure 3B:
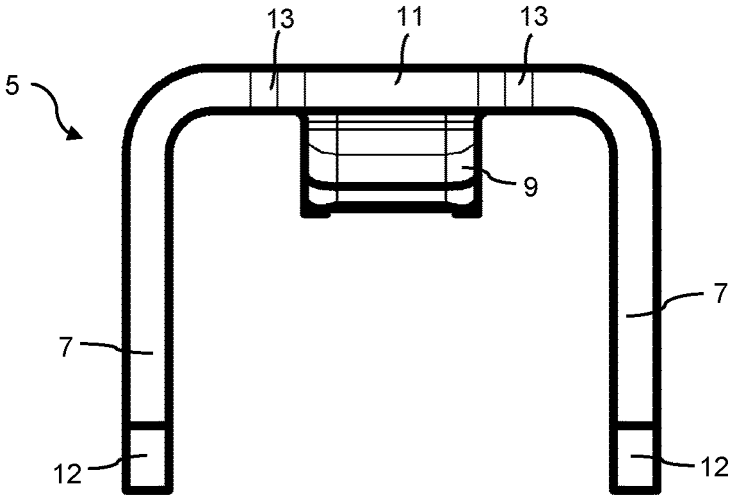
Figure 3C:
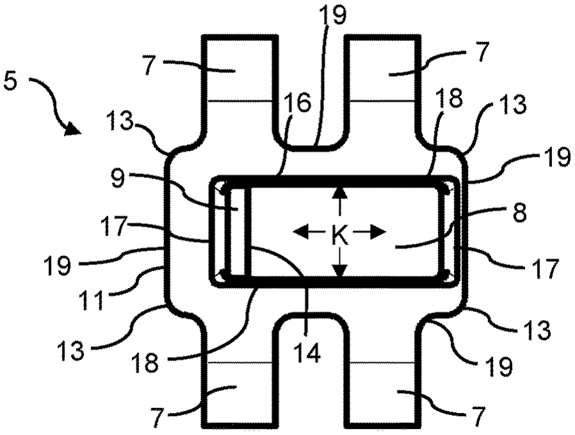
Figure 3D:
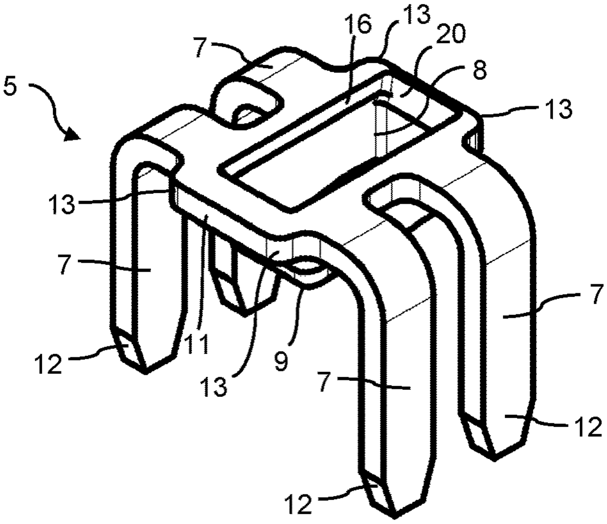
Figure 4A:
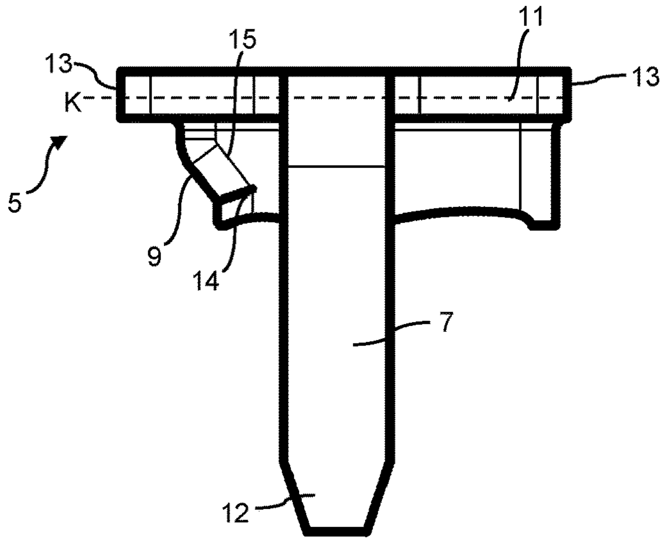
FIGS. 4*a*-4*d* show a contact part for a circuit board connecting terminal according to an example in a front view, side view, top view, and perspective view.
Figure 4B:
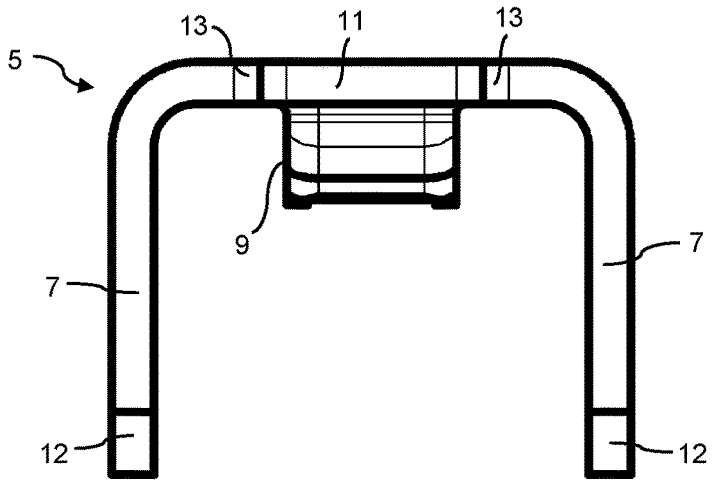
Figure 4C:
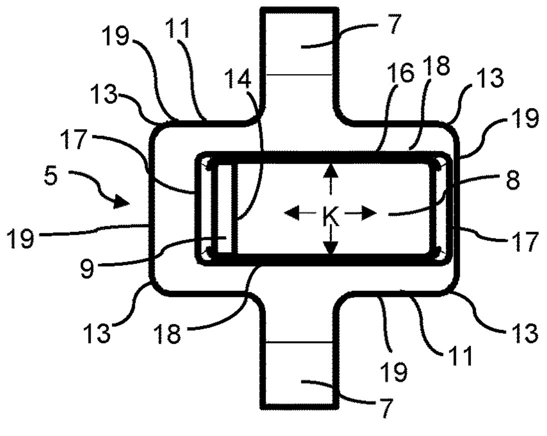
Figure 4D:
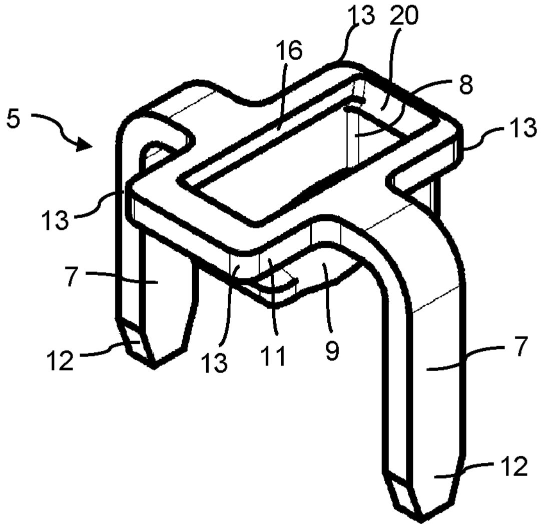
Figure 5A:
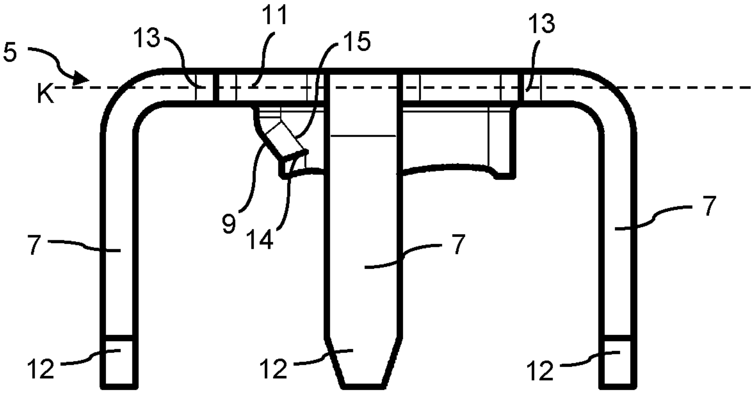
FIGS. 5*a*-5*d* show a contact part for a circuit board connecting terminal according to an example in a front view, side view, top view, and perspective view.
Figure 5B:
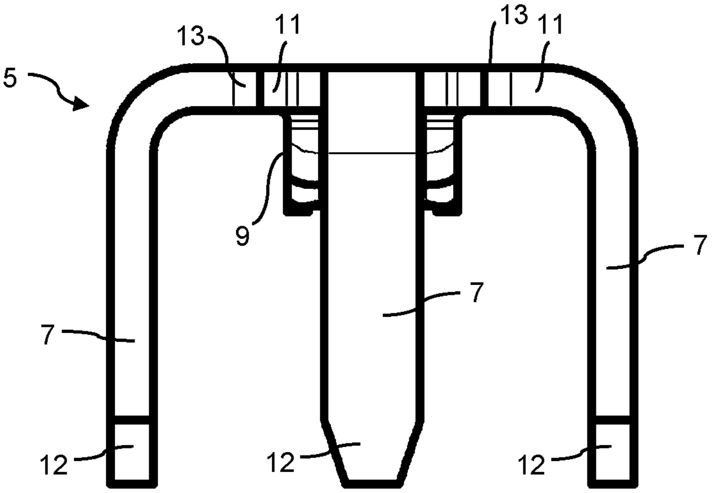
Figure 5C:
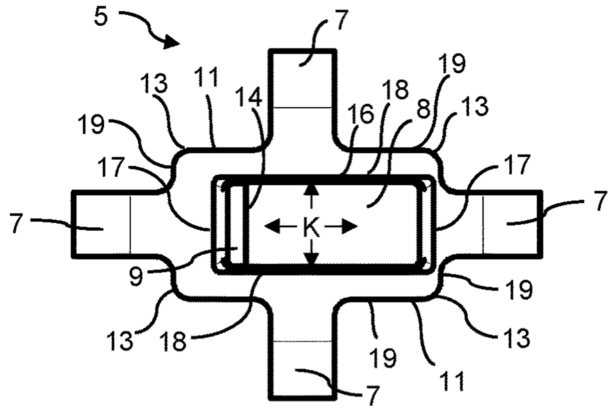
Figure 5D:
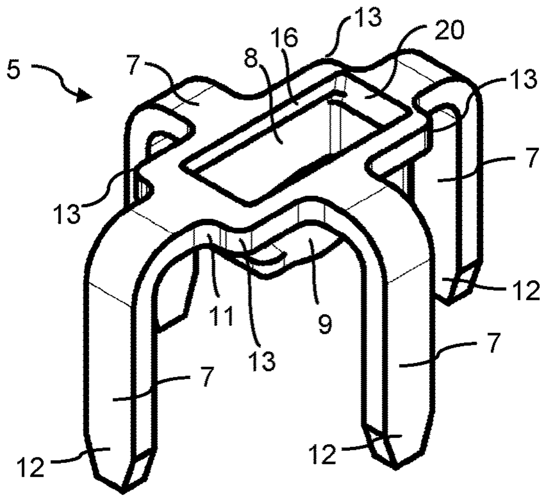
Figure 6A:
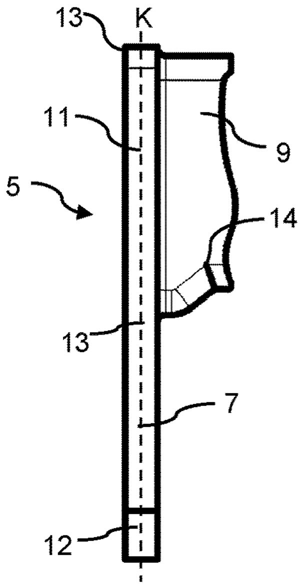
FIGS. 6*a*-6*d* show a contact part for a circuit board connecting terminal according to an example in a front view, side view, top view, and perspective view.
Figure 6B:
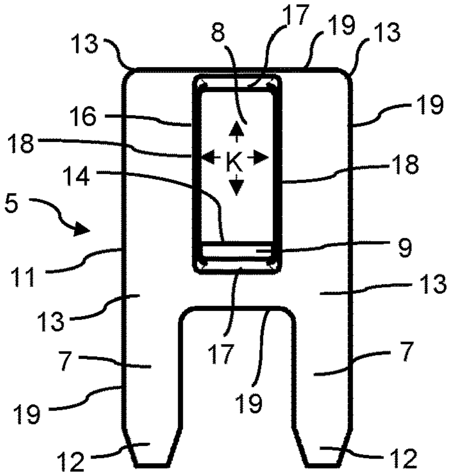
Figure 6C:
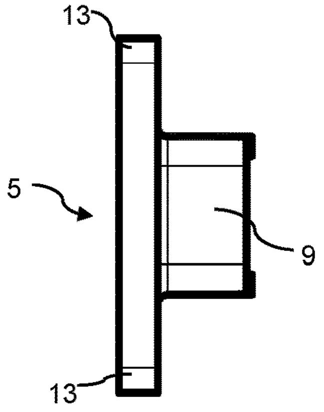
Figure 6D:
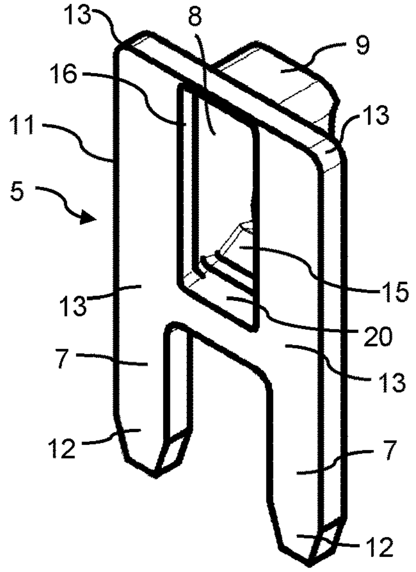
Figure 7A:
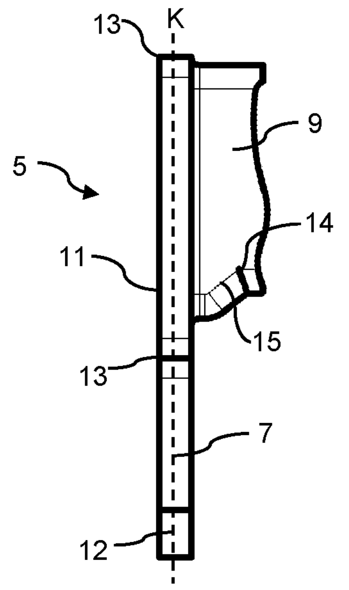
FIGS. 7*a*-7*d* show a contact part for a circuit board connecting terminal according to an example in a front view, side view, top view, and perspective view.
Figure 7B:
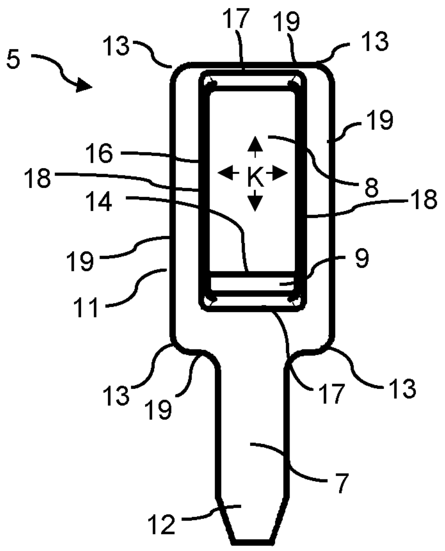
Figure 7C:
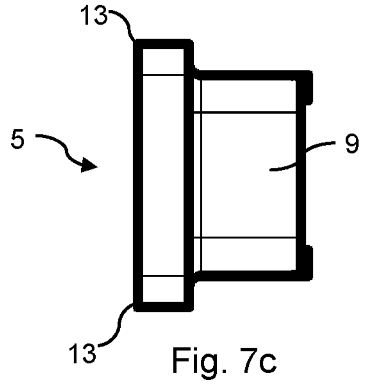
Figure 7D:
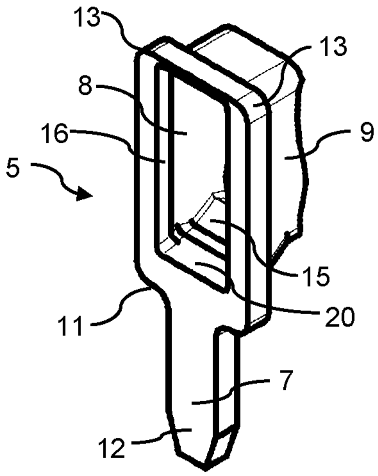
Figure 8A:
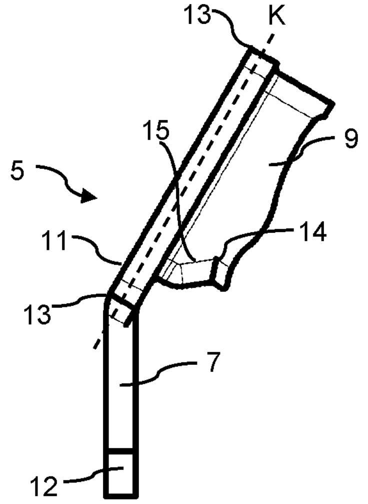
FIGS. 8*a*-8*d* show a contact part for a circuit board connecting terminal according to an example in a front view, side view, top view, and perspective view.
Figure 8B:
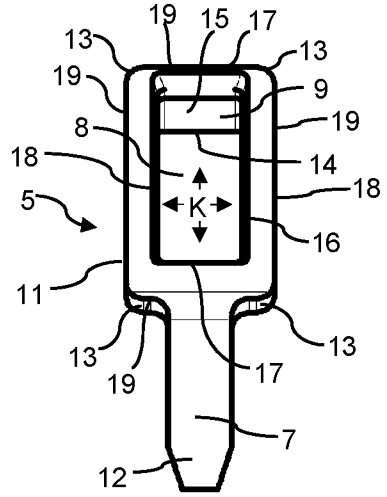
Figure 8C:
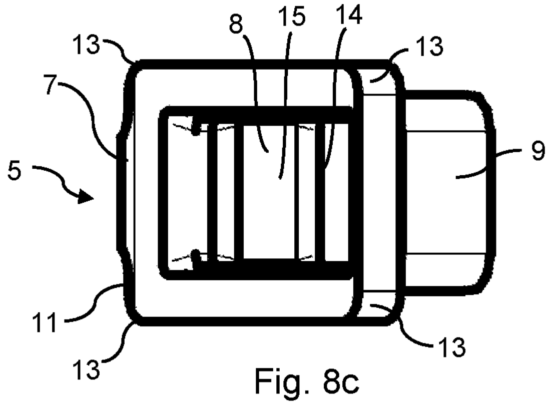
Figure 8D:
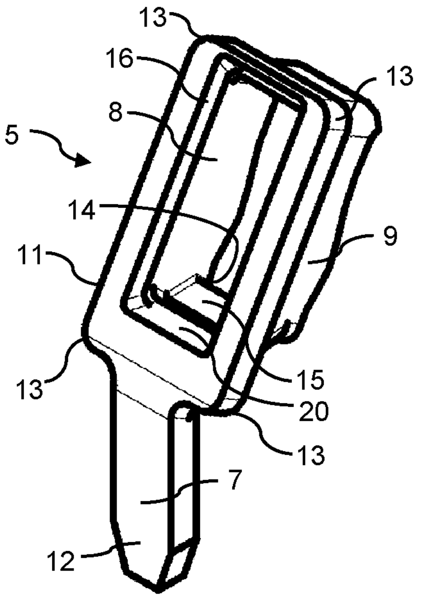
Figure 9A:
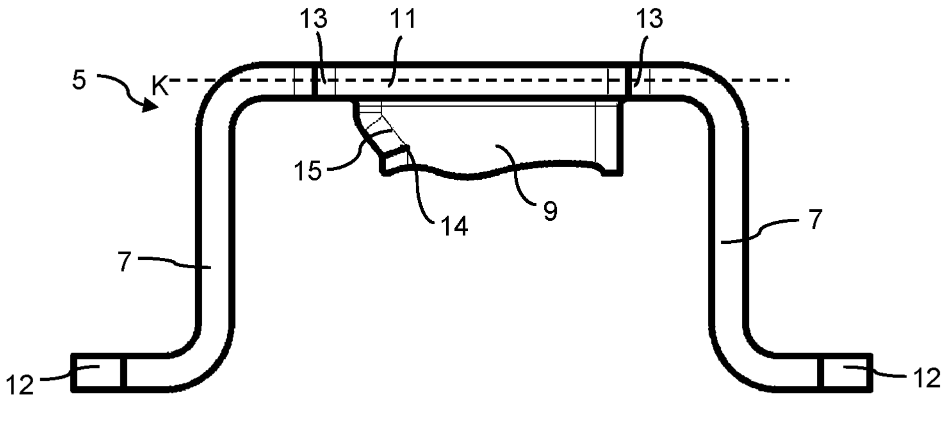
FIGS. 9*a*-9*d* show a contact part for a circuit board connecting terminal according to an example in a front view, side view, top view, and perspective view.
Figure 9B:
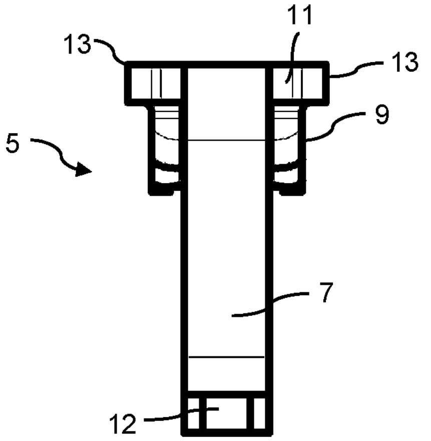
Figure 9C:
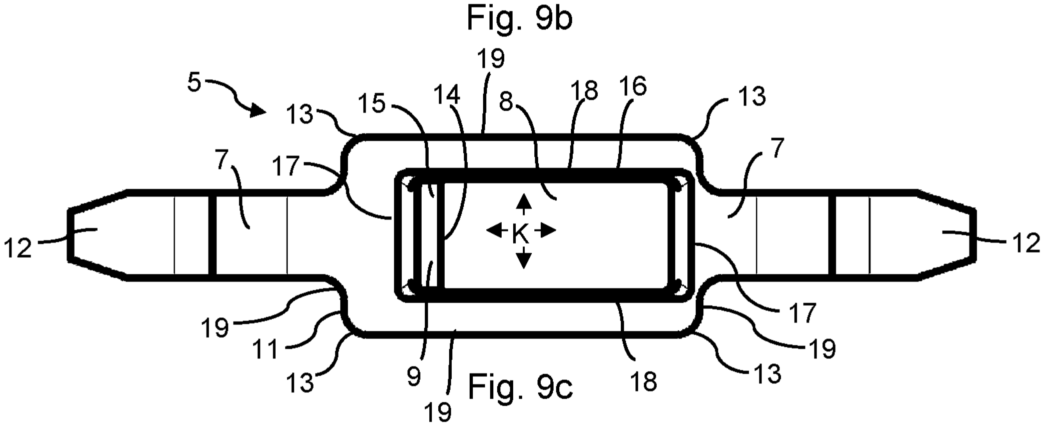
Figure 9D:
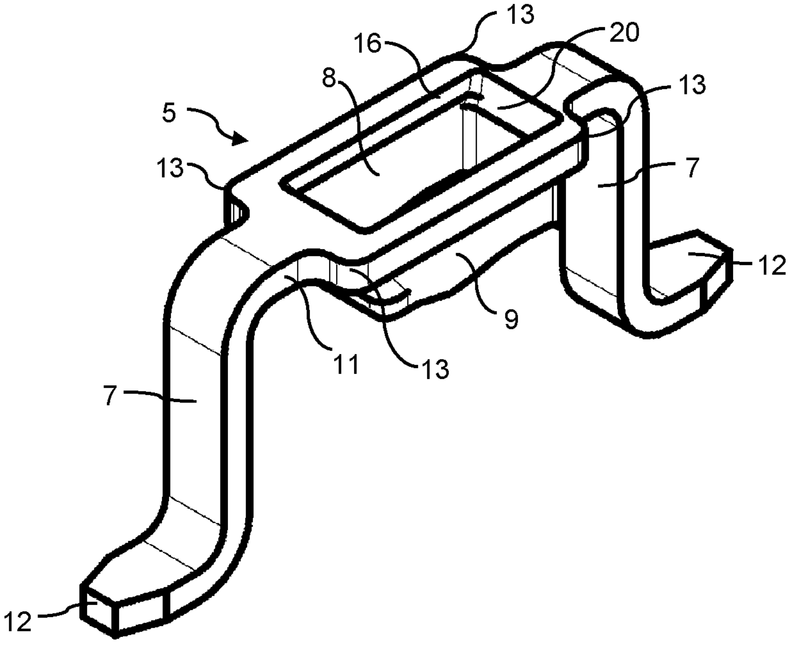

FIGS. 1*a* to 9*d* show different example of contact parts 5 for a circuit board connecting terminal 1 shown by way of example in FIGS. 11*a* to 11*d*. The circuit board connecting terminal 1 serves to connect an electrical conductor 2 shown in FIG. 11*a* to a printed circuit board 21 shown by way of example in FIGS. 10*a* to 10*c*. The circuit board connecting terminal 1 has a contact insert 4 with a contact part 5 and a clamping spring 6, with which the electrical conductor 2 inserted into the circuit board connecting terminal 1 can be clamped against the contact part 5 in order to produce an electromechanical connection between the conductor 2 and the contact part 5.

The contact parts 5 have one or more connection elements 7 for joining the circuit board connecting terminal 1 to the printed circuit board 21, depending on the example. The contact parts 5 have a through opening 8 that is designed as a plunged feature in the examples, which is delimited by an opening edge 20 and framed by a surrounding edge collar 9. The conductor 2 can be clamped to the opening edge 20 and the edge collar 9 by means of the clamping spring 6. The edge collar 9 is made as one piece with the contact part 5 and formed from the contact part 5 via the plunging method. In the examples shown, the edge collar 9 has a contact edge 14 and a lead-in chamfer 15. The through opening 8 can have a quadrilateral passage contour 16 with narrow sides 17 and long sides 18 that are longer than the narrow sides 17.

The connection elements 7 of the contact parts 5 shown in the figures are designed as soldered contact pins and each have a connection 12 designed as a soldered connection for joining the connection elements 7 to the printed circuit board 21. The connection elements 7 are designed to be integral with the contact parts 5 and, depending on the example, project flat from the outer contour 11 of the contact part 5 or are bent down from the outer contour 11 of the contact part 5.

FIGS. 1*a* to 1*d* show a contact part 5 according to an example. The contact part 5 has two connection elements 7, each with a connection 12 that the connection element 7 transitions directly into without further angling or bending. The connection elements 7 are arranged on mutually opposite outer contour sides 19 and are bent down, essentially at right angles, from the contact part 5 whose main extent lies in the contact part plane K. The connection elements 7 are bent down from outer contour sides 19 that extend essentially parallel to narrow sides 17 of the passage contour 16. The two connection elements 7 extend essentially parallel to one another and project from the contact part 5 in the same spatial direction as the edge collar 9. The connection elements 7 are placed essentially centered between two corner regions 13 of the contact part 5. The two connection elements 7 have essentially the same linear dimension L between their free end and the contact part plane K. In the region of the clamping point that is provided on a narrow side 17 of the passage contour 16, the contact part 5 can be well supported on the printed circuit board 21 by the adjacent connection element 7.

FIGS. 2*a* to 2*d* show a contact part 5 according to an example. The contact part 5 has two connection elements 7, each with a connection 12 that the connection element 7 transitions directly into without further angling or bending. The connection elements 7 are arranged on mutually opposite outer contour sides 19 and are bent down, essentially at right angles, from the contact part 5 whose main extent lies in the contact part plane K. The connection elements 7 are bent down from outer contour sides 19 that extend essentially parallel to narrow sides 17 of the passage contour 16. The two connection elements 7 extend essentially parallel to one another and project from the contact part 5 in the same spatial direction as the edge collar 9. The connection elements 7 are placed essentially centered between two corner regions 13 of the contact part 5. The second example differs from the first example shown in FIGS. 1*a* to 1*d* in particular in that the two connection elements 7 have different linear dimensions L between their free end and the contact part plane K. In this way, an inclined position of the contact part 5 relative to the printed circuit board 21 is achieved, which can make easier conductor insertion possible.

FIGS. 3*a* to 3*d* show a contact part 5 according to example. The contact part 5 has four connection elements 7, each with a connection 12 that the connection element 7 transitions directly into without further angling or bending. Arranged on two mutually opposite outer contour sides 19 are two connection elements 7 each that are bent down, essentially at right angles, from the contact part 5 whose main extent lies in the contact part plane K. The connection elements 7 are bent down from outer contour sides 19 that extend essentially parallel to long sides 18 of the passage contour 16. The four connection elements 7 extend essentially parallel to one another and project from the contact part 5 in the same spatial direction as the edge collar 9. Two connection elements 7 in each case are placed between two corner regions 13 of the contact part 5. A stabile and secure joining of the circuit board connecting terminal 1 to the printed circuit board 21 is made possible with the contact part 5.

FIGS. 4*a* to 4*d* show a contact part 5 according to an example. The contact part 5 has two connection elements 7, each with a connection 12 that the connection element 7 transitions directly into without further angling or bending. The two connection elements 7 are arranged on two mutually opposite outer contour sides 19 and are bent down, essentially at right angles, from the contact part 5 whose main extent lies in the contact part plane K. The connection elements 7 are bent down from outer contour sides 19 that extend essentially parallel to long sides 18 of the passage contour 16. The two connection elements 7 extend essentially parallel to one another and project from the contact part 5 in the same spatial direction as the edge collar 9. One connection element 7 in each case is placed mainly centered between two corner regions 13 of the contact part 5. Good accessibility of the clamping point that, in the example shown, is present on a narrow side 17 of the passage contour 16 is provided with the contact part 5.

FIGS. 5*a* to 5*d* show a contact part 5 according to an example. The contact part 5 has two connection elements 7, each with a connection 12 that the connection element 7 transitions directly into without further angling or bending. One connection element 7 in each case is arranged on every outer contour side 19 of the contact part 5. The connection elements 7 are bent down essentially at right angles from the contact part 5, whose main extent lies in the contact part plane K. The connection elements 7 extend essentially parallel to one another and project from the contact part 5 in the same spatial direction as the edge collar 9. One connection element 7 in each case is placed mainly centered between two corner regions 13 of the contact part 5. Uniform and stabile joining of the circuit board connecting terminal 1 to the printed circuit board 21 is possible with the contact part 5.

FIGS. 6*a* to 6*d* show a contact part 5 according to an example. The contact part has two connection elements 7, each with a connection 12 that the connection element 7 transitions directly into without further angling or bending. The connection elements 7 are arranged on a common outer contour side 19 of the contact part 5 that extends essentially parallel to a narrow side 17 of the passage contour 16. The connection elements 7 project from the contact part 5 without angling or bending in the contact part plane K. The connection elements 7 extend essentially parallel to one another and project from the contact part 5 in a different spatial direction than the edge collar 9. One connection element 7 in each case originates at a corner region 13 of the contact part 5. With the contact part 5 according to the example, a circuit board connecting terminal 1 can be joined to the printed circuit board 21 in such a manner that a conductor insertion is possible from a different spatial direction than with the first to fifth examples. The conductor insertion can take place essentially parallel to or at small angles to the printed circuit board 21 in this case. Moreover, a very small-profile circuit board connecting terminal 1 can be created.

FIGS. 7*a* to 7*d* show a contact part 5 according to an example. The contact part has a connection element 7 with a connection 12 that the connection element 7 transitions directly into without further angling or bending. The connection element 7 is arranged on an outer contour side 19 of the contact part 5 that extends essentially parallel to a narrow side 17 of the passage contour 16. The connection element 7 projects from the contact part 5 without angling or bending in the contact part plane K. The connection element 7 projects from the contact part 5 in a different spatial direction than the edge collar 9. The connection element 7 is arranged approximately centered between two corner regions 13 of the contact part 5. An even more compact circuit board connecting terminal 1 can be created with the contact part 5 according to the seventh example as compared with the sixth example.

FIGS. 8*a* to 8*d* show a contact part 5 according to an example. The contact part has a connection element 7 with a connection 12 that the connection element 7 transitions directly into without further angling or bending. The connection element 7 is arranged on an outer contour side 19 of the contact part 5 that extends essentially parallel to a narrow side 17 of the passage contour 16. The connection element 7 is bent down from the contact part 5 in relation to the contact part plane K and projects from the contact part 5 at an angle that is greater than approximately 10°. The connection element 7 projects from the contact part 5 in a different spatial direction than the edge collar 9. The connection element 7 is arranged approximately centered between two corner regions 13 of the contact part 5. An inclined position of the contact part 5 relative to the printed circuit board 21, which can make easier conductor insertion possible, can be achieved with the contact part 5.

FIGS. 9*a* to 9*d* show a contact part 5 according to an example. The contact part 5 has two connection elements 7, each with a connection 12 that the connection element 7 transitions into with a bend that is essentially 90°. The connection elements 7 are arranged on mutually opposite outer contour sides 19 and are bent down, essentially at right angles, from the contact part 5 whose main extent lies in the contact part plane K. The connection elements 7 are bent down from outer contour sides 19 that extend essentially parallel to narrow sides 17 of the passage contour 16. The two connection elements 7 extend essentially parallel to one another and project from the contact part 5 in the same spatial direction as the edge collar 9. The connection elements 7 are placed essentially centered between two corner regions 13 of the contact part 5. Improved joining of the conductor connection terminal 1 to the printed circuit board 21 is possible with the angled connections 12 because the connections 12 can rest against a surface on the conductor connection terminal 1. In this way, the circuit board connecting terminal 1 can also be designed as an SMD component. Moreover, a low-profile conductor connection terminal 1 can be created herewith that is also suitable for an arrangement in a recess 22 of the printed circuit board 21 as shown in FIG. 10*b* or 10*c*.

Figure 10A:
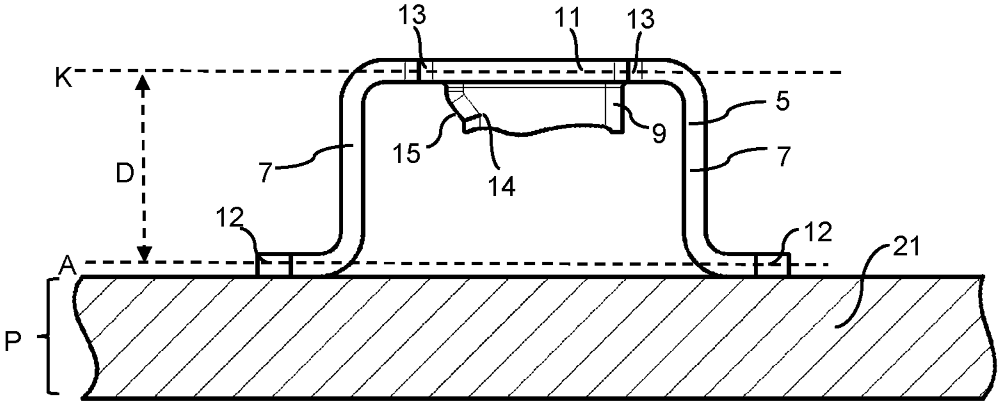
FIGS. 10*a*-10*c* show three connection variants for connecting a contact part of a circuit board connecting terminal to a printed circuit board in front views.
Figure 10B:
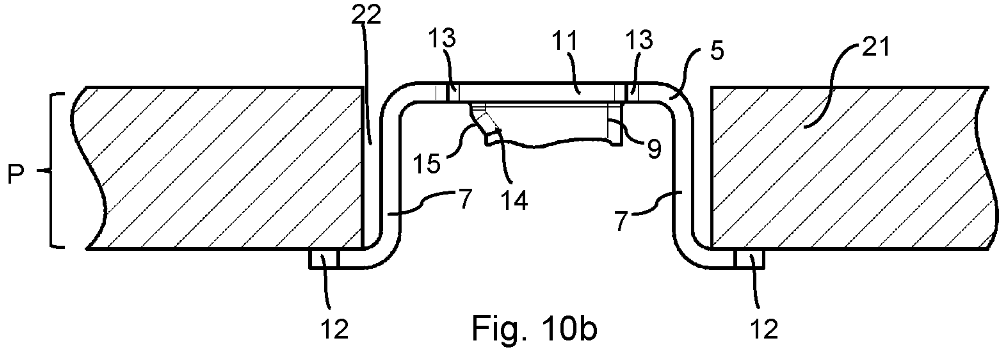
Figure 10C:
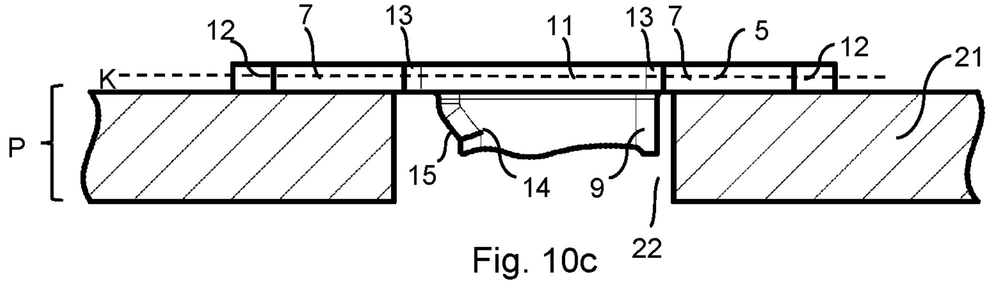

FIGS. 10*a* to 10*c* show different options for connecting conductor connection terminals 1 to printed circuit boards 21, wherein only the contact part 5 of the conductor connection terminals 1 is shown in order to promote understanding. Shown in FIG. 10*a* is the way a contact part 5 according to the example is joined to the surface of a printed circuit board 21 by means of the connections 12. The connections 12 in this case are spaced apart from the contact part plane 5 in such a manner that the through opening 8 and the edge collar 9 of the contact part 5 are spaced apart from the printed circuit board 21. For this purpose, a distance D is present between the connection plane A and the contact part plane K. The contact part 5 is arranged above a circuit board plane P on a top of the printed circuit board 21. Shown in FIG. 10*b* is that the printed circuit board 21 has a recess 22 into which projects a contact part 5 according to the example. The connections 12 are joined to the printed circuit board 21 on a bottom thereof opposite the top mentioned with regard to FIG. 10*a*. Here, too, a distance D is present between the connection plane A and the contact part plane K, but it is possible to arrange at least sections of the contact part 5 in the circuit board plane P owing to the recess 22 in the printed circuit board 21. In this way, an extremely low-profile circuit board connecting terminal 1 can be created that scarcely projects beyond the circuit board plane P. A conductor 2 to be connected is therefore connected virtually within the circuit board plane P. In FIG. 10*c*, the printed circuit board 21 likewise has a recess 22. Joined to the printed circuit board 21 is a contact part 5, in accordance with which the connection elements 7 project from the contact part 5 in the contact part plane K on two mutually opposing outer contour sides 19. The connection elements 7, together with the connections 12 into which the connection elements 7 transition in a flat manner with no angling, serve to join the contact part 5 to the printed circuit board 21 on both sides of the recess 22. The edge collar 9 of the contact part 5 can protrude into the recess 22 in this case, as shown. A very compact circuit board connection solution can be provided in this way, as well.

Figure 11A:
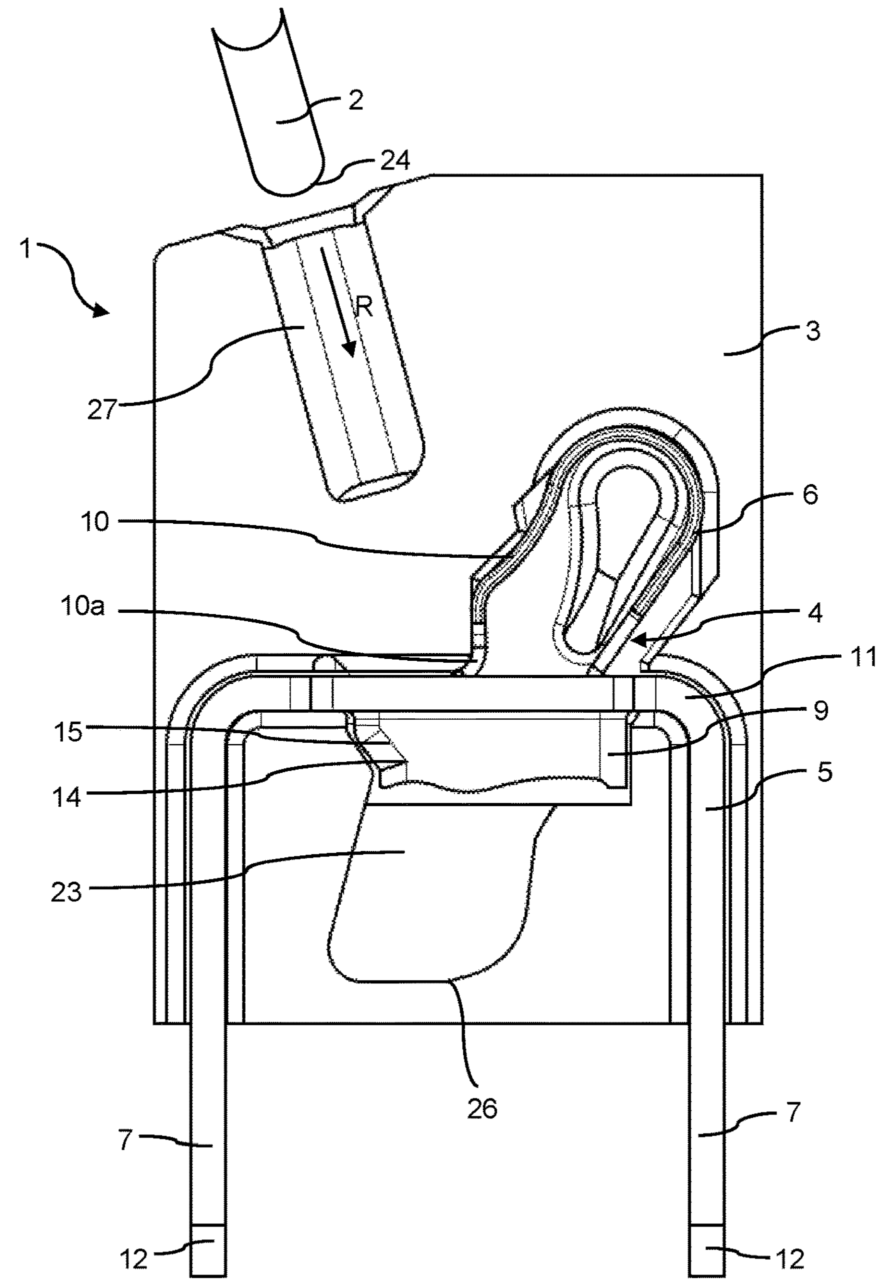
FIGS. 11*a*-11*d* show a conductor connection terminal in a sectional front view, a top view, a side view, and a perspective view.
Figure 11B:
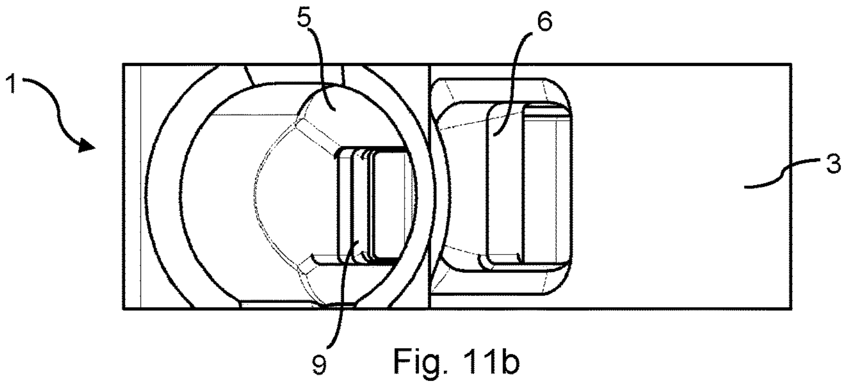
Figure 11C:
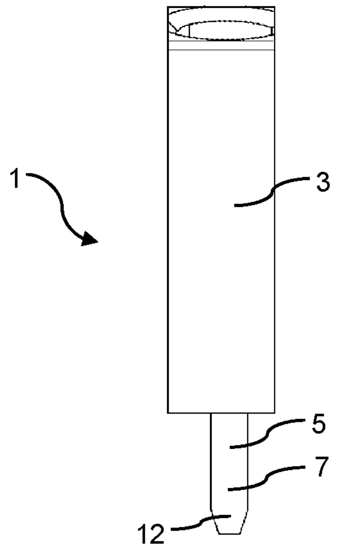
Figure 11D:
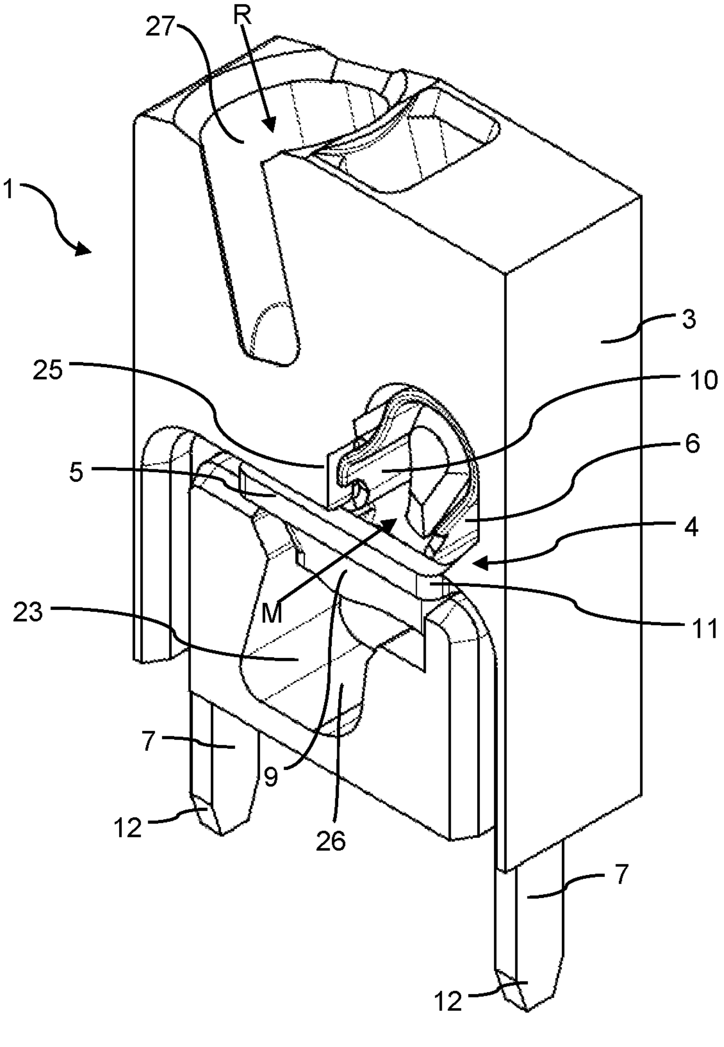

FIGS. 11*a* to 11*d* show a circuit board connecting terminal 1 having a contact insert 4 that has a contact part 5 and a clamping spring 6 with a clamping leg 10 that has a clamping edge 10*a*. The contact insert 4 is inserted into an insulating housing 3 that has appropriate receiving and support bays for the contact insert 4. The connection elements 7 extend partially inside, partially outside the insulating housing 3. The connections 12 of the connection elements 7 are arranged to be exposed outside the insulating housing 3 and consequently are easily accessible for a joining of the circuit board connecting terminal 1 to a printed circuit board 21. The insulating housing 3 has an essentially cylindrical conductor insertion passage 27, through which a conductor 2 can be guided in a conductor insertion direction R to the clamping point at the edge collar 9 of the through hole 8 for clamping the conductor 2. The insulating housing 3 has a conductor receiving space 23 for the conductor end 24 of the conductor 2 clamped to the contact part 5. At its floor, the conductor receiving space 23 simultaneously forms a conductor stop 26 for the inserted conductor 2 in order to limit the insertion travel thereof. As can be seen in FIG. 11*d*, the insulating housing 3 can be designed as two pieces with a base housing as shown in FIG. 11*d* and with a cover part. Let into the base housing is an installation opening 25, through which lateral installation of the contact insert 4 transverse to the conductor insertion direction R in the insulating housing 3 is possible. For this purpose, the installation opening 25 has an outline that corresponds approximately to the outer contours of the contact insert 4, so that intuitive and reliable installation is possible.

A compact circuit board connecting terminal 1 with a flat structure and a material-reduced contact part 5 can be made possible with the conductor connection terminal 1 presented and the described contact parts 5. As is shown with the examples, versatile options can now be provided for connecting conductors 2 that can be brought to the through opening 8 of the contact part 5 from different spatial directions. The circuit board connection solution presented is very compatible in design terms with different actuation types, and can be actuated easily with a lever, pushbutton, or separate tool, for example. The opening edge 20 and/or an edge collar 9 of the through hole 8 forms a defined contact region with good current transfer properties. In a connection position, sections of the conductor 2 can project into the through opening 8 so that a reliable clamping of the conductor 2 to the opening edge 20 and/or edge collar 9 is possible.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A circuit board connecting terminal to connect an electrical conductor to a printed circuit board, the circuit board connecting terminal comprising:

a contact insert that has a contact part and a clamping spring, wherein an electrical conductor inserted into a through opening of the contact part is adapted to be clamped against the contact part with the clamping spring; and a connection element that extends from the contact part and that joins the circuit board connecting terminal to the printed circuit board, wherein the through opening is delimited by an opening edge, wherein the electrical conductor is adapted to be clamped to the opening edge of the through opening via the clamping spring, wherein the opening edge of the through opening has an edge collar that projects therefrom, and wherein the connection element projects from an outer contour of the contact part, the outer contour of the contact part being spaced apart from the opening edge of the through opening.

2. The circuit board connecting terminal according to claim 1, wherein the edge collar surrounds the through opening in sections or completely.

3. The circuit board connecting terminal according to claim 1, wherein the edge collar is formed as one piece with the contact part.

4. The circuit board connecting terminal according to claim 1, wherein the through opening is produced as a plunged feature.

5. The circuit board connecting terminal according to claim 1, wherein the connection element has a connection to join the connection element to the printed circuit board.

6. The circuit board connecting terminal according to claim 5, wherein the connection is spaced apart from a contact part plane such that the through opening and/or an edge collar of the contact part is spaced apart from the printed circuit board when the circuit board connecting terminal is connected to the printed circuit board via the connection, wherein the contact part plane extends along a main extent of the contact part, and wherein the edge collar at least partly surrounds the through opening of the contact part.

7. The circuit board connecting terminal according to claim 6, wherein the connection is spaced apart from a contact part plane such that the through opening and/or an edge collar of the contact part lies in a circuit board plane of the printed circuit board when the circuit board connecting terminal is connected to the printed circuit board via the connection, wherein the contact part plane extends along a main extent of the contact part, and wherein the edge collar at least partly surrounds the through opening of the contact part.

8. The circuit board connecting terminal according to claim 7, wherein the contact part is configured for sections of the contact part to project into a recess in the printed circuit board when the circuit board connecting terminal is connected to the printed circuit board via the connection.

9. The circuit board connecting terminal according to claim 5, wherein the connection element transitions into the connection at a free end of the connection element without angling or bending.

10. The circuit board connecting terminal according to claim 5, wherein the connection is bent down or angled from the connection element.

11. The circuit board connecting terminal according to claim 5, wherein the connection is a soldered connection or a plug-in connection.

12. The circuit board connecting terminal according to claim 1, wherein the connection element is formed to be integral with the contact part.

13. The circuit board connecting terminal according to claim 1, wherein the connection element is a contact pin.

14. The circuit board connecting terminal according to claim 1, wherein the connection element is bent down from the contact part.

15. The circuit board connecting terminal according to claim 1, wherein the connection element projects from the contact part in a contact part plane, and wherein the contact part plane extends along a main extent of the contact part.

16. The circuit board connecting terminal according to claim 1, wherein at least sections of the edge collar of the contact part extend essentially parallel to the connection element.

17. The circuit board connecting terminal according to claim 1, wherein the connection element is bent down from the outer contour of the contact part.

18. The circuit board connecting terminal according to claim 1, wherein the connection element is arranged on a corner region of the contact part or between two corner regions of the contact part.

19. The circuit board connecting terminal according to claim 1, wherein the circuit board connecting terminal has at least two connection elements.

20. The circuit board connecting terminal according to claim 19, wherein the at least two connection elements are arranged on at least two different outer contour sides of the contact part.

21. The circuit board connecting terminal according to claim 20, wherein at least one connection element of the at least two connections elements is provided per outer contour side of the contact part.

22. The circuit board connecting terminal according to claim 19, wherein the at least two connection elements extend essentially parallel to one another.

23. The circuit board connecting terminal according to claim 19, wherein at least one connection element of the at least two connections elements has a greater linear dimension than another connection element of the contact part.

24. The circuit board connecting terminal according to claim 1, wherein the edge collar has at least one radially inward extending contact edge.

25. The circuit board connecting terminal according to claim 24, wherein a clamping edge of a clamping leg of the clamping spring is arranged opposite the contact edge when the electrical conductor is clamped to the edge collar.

26. The circuit board connecting terminal according to claim 1, wherein the edge collar has a lead-in chamfer.

27. The circuit board connecting terminal according to claim 1, wherein the through opening has a quadrilateral passage contour.

28. The circuit board connecting terminal according to claim 27, wherein the passage contour has narrow sides and long sides, wherein the long sides are longer than the narrow sides, and wherein the connection element is arranged on an outer contour side of the contact part that extends essentially parallel to a narrow side of the passage contour.

29. The circuit board connecting terminal according to claim 1, wherein the circuit board connecting terminal has an insulating housing that accommodates the contact part and the clamping spring therein.

30. The circuit board connecting terminal according to claim 29, wherein the insulating housing has a conductor receiving space for a conductor end of the electrical conductor clamped onto the contact part.

31. The circuit board connecting terminal according to claim 30, wherein the insulating housing has a conductor stop.

32. The circuit board connecting terminal according to claim 29, wherein the insulating housing has a lateral installation opening for insertion of the contact part or contact insert transverse to a conductor insertion direction.

33. The circuit board connecting terminal according to claim 29, wherein the insulating housing has a conductor insertion passage.

34. A contact part for a circuit board connecting terminal, the contact part comprising:

a planar main body;

a through opening, the through opening having an opening edge delimiting the same, an electrical conductor being adapted to be clamped onto the opening edge of the through opening via a clamping spring; and a connection element that extends from the contact part to join the contact part to a printed circuit board, wherein the opening edge of the through opening has an edge collar that projects therefrom, and wherein the connection element projects from an outer contour of the contact part, the outer contour of the contact part being spaced apart from the opening edge of the through opening.

35. A printed circuit board comprising:

a circuit board connecting terminal joined to a surface of the printed circuit board, the circuit board connecting terminal provided to connect an electrical conductor to the printed circuit board, the circuit board connecting terminal comprising a contact insert that has a contact part and a clamping spring, wherein an electrical conductor inserted into a through opening of of the circuit board connecting terminal contact part is adapted to be clamped against the contact part with the clamping spring, wherein the circuit board connecting terminal is joined to the printed circuit board via a connection element that extends from of the contact part, wherein the through opening is delimited by an opening edge, wherein the electrical conductor is adapted to be clamped to the opening edge of the through opening via the clamping spring, wherein the opening edge of the through opening has an edge collar that projects therefrom, and wherein the connection element projects from an outer contour of the contact part, the outer contour of the contact part being spaced apart from the opening edge of the through opening.

36. The printed circuit board according to claim 35, wherein the printed circuit board has a recess into which at least sections of the contact part of the circuit board connecting terminal project.

* * * * *